O. LEHMANN.
AUDIBLE SIGNAL FOR ROAD VEHICLES.
APPLICATION FILED MAR. 31, 1917.

1,281,595.

Patented Oct. 15, 1918.

Oscar Lehmann
INVENTOR

BY J. M. Thomas
ATTORNEY

UNITED STATES PATENT OFFICE.

OSCAR LEHMANN, OF SALT LAKE CITY, UTAH.

AUDIBLE SIGNAL FOR ROAD-VEHICLES.

1,281,595.　　　　　Specification of Letters Patent.　　Patented Oct. 15, 1918.

Application filed March 31, 1917.　Serial No. 159,017.

*To all whom it may concern:*

Be it known that I, OSCAR LEHMANN, a citizen of the United States, residing at Salt Lake City, in the county of Salt Lake and State of Utah, have invented certain new and useful Improvements in Audible Signals for Road-Vehicles, of which the following is a specification.

My invention relates to road vehicle signals, and has for its object to provide an apparatus for attachment on road vehicles which will give an audible signal when the motive power on the vehicle is connected or shifted preparatory to backing the vehicle, and which will continue to sound as long as the motive power is connected in the reverse action.

These objects I accomplish with the apparatus illustrated in the accompanying drawings in which similar letters and numerals of reference indicate like parts throughout the several figures and as described in the specification forming a part of this application and pointed out in the appended claim.

Figure 2:
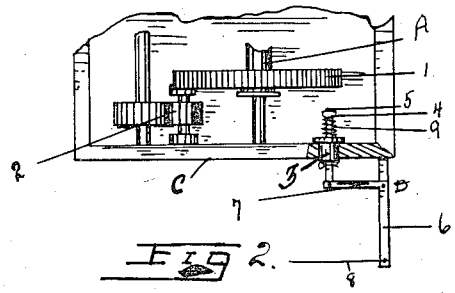
Figure 1:
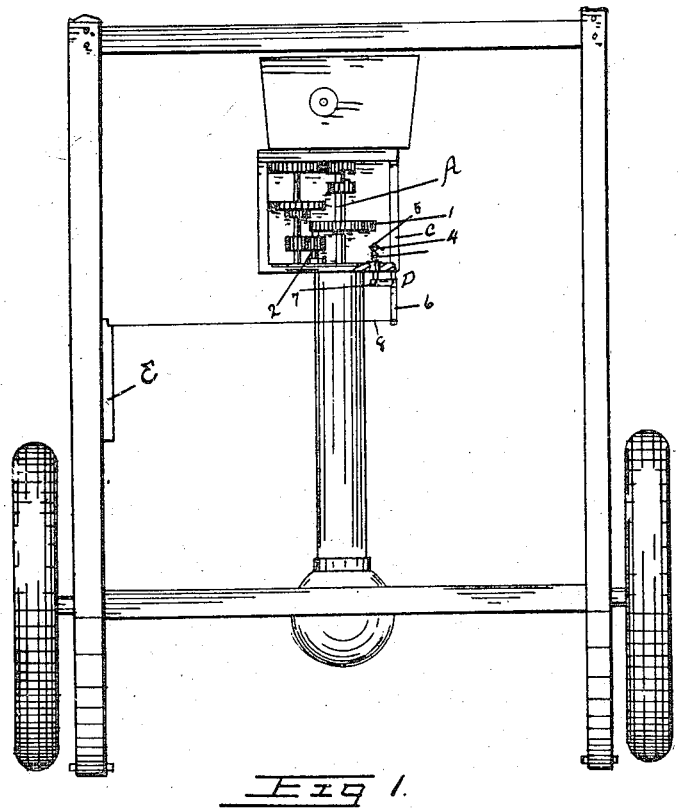

In the drawings in which I have shown a substantial embodiment of my invention Figure 1 is a plan view of the apparatus on the chassis of an automobile. Fig. 2 is a plan view somewhat enlarged from Fig. 1, of the low and reverse slidable gear wheel of a road vehicle mechanism and my apparatus in operative connection therewith.

In using road vehicles it is frequently necessary to back the vehicle at places where injury might occur to persons and animals unless some warning is given of the backward movement in time to avoid the injury, and the operator forgets to give the warning. The present invention automatically gives such warning before and while the vehicle is being moved rearwardly thus avoiding accidents from such rearward movement, and consists of a driven shaft A on which is carried a low and reverse gear 1 of a common transmission mechanism. The said gear 1 is manually shifted on said shaft A to engage with the reverse gear 2 of the mechanism by which the vehicle is operated. In the wall of the transmission case C a bearing 3 is fastened. A ball carrying plunger 4 is carried in said bearing 3 in one end of which a ball 5 is carried. A bell crank lever D is fulcrumed on the said case C with one arm 7 in operative connection with the opposite end of said plunger 4, and the other arm 6 is connected by means of a flexible cord 8 to the signal E, which may consist of a horn, bell or other audible signal. A spring 9 is carried on said plunger 4 to hold it in normal position.

The operation of my apparatus is as follows:

When the transmission mechanism is in neutral and forward speed positions, the gear 1 is not in contact with the ball 5, but when the said gear 1 is shifted into position to mesh with the gear 2, which position is the reverse, the side of said gear 1 will contact with the ball 5 in the end of the plunger 4 and when said shifting is completed the movement will cause the plunger 4 to be moved longitudinally, which movement of said plunger will compress the spring 9 and the plunger will move the arm 7 of the bell crank lever D, and in turn the arm 6. The lateral movement of the end of the said arm 6 will move the cord 8 longitudinally and thereby sound the signal E. When the said gear 1 is shifted on the shaft A toward the front of the vehicle, and into neutral or forward speed, the gear 1 will be moved from contacting with the plunger 4 and the spring 9 will move said plunger longitudinally in the bearing 3 and the bell crank lever D will be moved on its pivot or fulcrum and the signal will stop.

Having thus described my invention I desire to secure by Letters Patent and claim:—

In a road vehicle signal the combination with the reverse gear of a transmission mechanism, of a plunger rod; a ball operatively mounted in one end portion of said rod; a spring carried on said plunger rod; a bell crank lever fulcrumed with one arm adjacent the other end of said plunger rod; and an audible signal operatively connected with the other arm of said bell crank lever.

In testimony whereof I have affixed my signature in presence of a witness.

OSCAR LEHMANN.

Witness:
SAM RANEY.